April 25, 1933.  R. C. DUNKELBERG  1,905,221
WATER SOFTENING APPARATUS
Filed Aug. 14, 1929
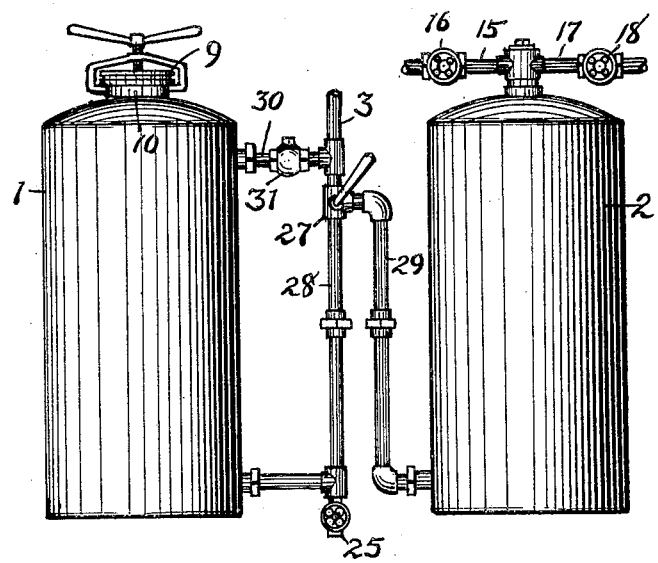
Ralph C. Dunkelberg
INVENTOR
BY
A. G. Burns ATTORNEY Patented Apr. 25, 1933

1,905,221

UNITED STATES PATENT OFFICE

RALPH C. DUNKELBERG, OF FORT WAYNE, INDIANA

WATER SOFTENING APPARATUS

Application filed August 14, 1929. Serial No. 385,754.

This invention relates to improvements in water softening apparatus in which is included a water softening tank for containing a zeolitic body, a storage tank for containing brine and the valve-controlled connections between a supply pipe and said tanks whereby water to be softened is directed into the water softening tank directly or indirectly through the brine tank.

The object of the invention is to provide a water softening tank containing a softening agent and a second tank in connection therewith containing a supply of brine for use in the regeneration of the softening agent in the former tank, and connections between said tanks and a source of supply of water to be softened, so arranged that the operations of directing the flow of water into the softening tank, or the flow of brine thereinto for regenerating the softening agent is simplified.

Another object of the invention is to provide in connection with a closed brine tank and a closed water softening tank, valve-controlled connections between said tanks and with a water supply line so arranged that water from the supply line is directed into the softening tank or a stored supply of brine is directed into the softening tank to regenerate the softening agent therein, by manipulation of the water supply valve.

These objects are accomplished by the construction illustrated in the accompanying drawing which is a side elevation of a structure embodying the invention.

The invention consists of a closed brine tank 1, water softening tank 2, a system of valve controlled pipes connecting said tanks with a water supply pipe 3, and a discharge outlet for the softening tank.

The brine tank 1 is preferably provided with a removable lid 9 for closing the neck 10 thereof and is of the usual type adapted to receive a deposit of salt, and water from the water supply pipe, whereby a quantity of brine is formed and held in storage in the tank for subsequent use.

The water softening tank 2 is closed and is provided at its upper end with an outlet which is connected with a distributing pipe 15 having a hand-operated valve 16 and also with a waste-pipe 17 provided with a hand-controlled valve 18. The water softening tank is of the usual construction adapted to contain a water softening agent such as a zeolitic body.

The water supply pipe 3 has connection with the upper end portion of the brine storage tank 1 by means of a pipe 30 having in line therewith an inlet check valve 31, and said water supply pipe also has connection with a three-way valve 27 which has pipe connections 28 and 29 with the lower end portions of the storage and softening tanks 1 and 2 respectively. The three-way valve 27 is of any suitable construction adapted to be manually operated so as to selectively connect the water supply pipe with the connection 29 so that water from the supply pipe 3 passes directly through the connection 29 into the softening tank, or indirectly through the brine tank, connections 28 and 29 into the softening tank accordingly as the three-way valve is adjustably positioned.

The check valve 31 is set so as to permit water from the supply pipe to flow into the brine tank, while preventing backflow from the brine tank into the water supply line 3. By this arrangement, should the withdrawal of water from the softening tank through its outlet become sufficiently rapid that the pressure in the softening tank is reduced below the pressure in the brine tank, the passage of brine into the water supply line and from thence into the softening tank is circumvented.

In operation, the supply pipe 3 is connected with a suitable source of water under pressure and the distributing pipe 15 is connected with the usual service pipe (not shown) through which water from the softening tank is conveyed to points where required for use. When the three-way valve 27 is turned to its position for connecting the supply pipe 3 with the intake pipe 29, water from the supply pipe thereupon flows into the softening tank and is discharged through the distributing pipe and is softened during its passage through the zeolitic body in the softening tank in the usual manner.

When the zeolitic body becomes ineffective through continuation of the softening operation the waste pipe valve 18 is opened and the three-way valve 27 is turned to its position for connecting the pipes 28 and 29, whereupon, water from the supply pipe 3 passes into the brine tank at its upper end causing a flow of brine from the lower end thereof through the pipes 28 and 29 into the softening tank at the lower end thereof which therein permeates the zeolitic body causing rejuvenation thereof. The water in the softening tank, displaced by the inflow of brine is finally discharged through the waste pipe 17. The three-way valve is then returned to its former position so that the supply of brine is shut off and water from the supply pipe is turned into the softening tank through the pipe 29 and allowed to flow out through the waste pipe until the zeolitic body has been flushed clear of brine after which the waste pipe is closed. The apparatus is then in condition for renewed operation.

A feature of the invention lies in the simplicity of the connections between the brine and softening tanks whereby brine from the brine tank and the water from the supply pipe are selectively admitted to the water softening tank by manipulating a single valve which controls said connections, while the waste pipe for the softening tank is opened, or, when water is being withdrawn through the distributing line.

Also, as the brine is fed to the softening tank upon turning of valve 27 the brine tank is automatically replenished with water from the supply pipe, which otherwise would require further manipulation upon the part of the operator.

What I claim is:—

Water softening apparatus having a closed brine tank provided with a check-valve controlled water intake pipe at its top and a discharge pipe at its bottom; a water softening tank having an outlet at its top and an intake pipe connected with its bottom; and a water supply pipe communicating with the intake pipe for the brine tank and provided with a valve which valve has connections with the brine discharge pipe and the intake pipe for the softening tank, said valve being so disposed as to establish communication between the supply pipe and the softening tank or between said brine tank and the water softening tank, accordingly as said valve is adjusted.

In testimony whereof I affix my signature.

RALPH C. DUNKELBERG.